Aug. 3, 1948. T. W. STEINKE 2,446,310
V-TYPE BELT
Filed Jan. 16, 1945

INVENTOR.
THEODORE W. STEINKE
BY
Martin E. Anderson
attorney

Patented Aug. 3, 1948

2,446,310

UNITED STATES PATENT OFFICE 2,446,310

V-TYPE BELT

Theodore W. Steinke, Denver, Colo., assignor to Gates Rubber Company, Denver, Colo., a corporation of Colorado Application January 16, 1945, Serial No. 573,033

2 Claims. (Cl. 74—233)

This invention relates to improvements in belts of the side driving V-type.

In the transmission of power by belts, it has been found that instead of the usual tension layer of cotton cords, excellent results and longer belt life are obtained when stranded metal tension wires are used instead of the ordinary cotton cords. It has been found, however, that if stranded metal tension wires are substituted for the ordinary cotton cords in belts otherwise constructed in the usual manner, the bond between the metal and the rubber composition, comprising or forming parts of the belt body, loosens and when this occurs the belt begins to deteriorate quite rapidly.

It is the object of this invention to produce a belt in which the separation of the tension layer from the body of the belt will be either entirely prevented or greatly retarded, thereby prolonging the life of the belt.

The invention, briefly described, consists in covering the tension layer with a tacky rubber gum composition having the properties of effecting a good adhesion with the metal surfaces. The gum in close contact with the wires may either be free from fibers or impregnated with vegetable fibers such as cotton.

Having thus set out the objects of the invention, and in a general way described the construction, the invention will now be described in detail, and for this purpose reference will be had to the accompanying drawing in which the invention has been illustrated, and in which.

Figure 3:
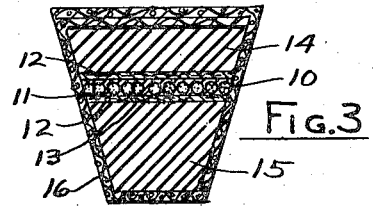
Figure 3 is a section also taken on line 2—2, Figure 1, but shows a slightly modified form of construction.
Figure 5:
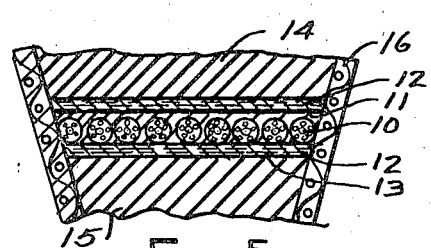
Figure 5 is a fragmentary section corresponding to the section shown in Figure 3 and to a somewhat larger scale.

In the drawing reference numeral 10 designates a tension layer formed from stranded metal wires. The metal wires as shown in Figures 3 and 5 are enclosed in a covering 11 of gum having the properties of effecting a good adhesion with the metal surfaces. Such gum is usually the ordinary natural rubber compounded so as to remain soft. On the outside of the gum covering are laminations 12 of a similar gum composition with which is mixed cotton fibers 13 that extend transversely of the belt. On the outer side of the central body is a body of rubber composition 14 and on the inside of the central body is a body 15 of rubber composition. The portions on the outside and inside of the central body may be free from fiber or mixed with fibers or may be made from bias or straight cut rubberized fabric as this invention is independent of the specific nature of those portions of the belt. Enclosing the belt is a covering 16 of rubberized bias cut fabric.

Figure 1:
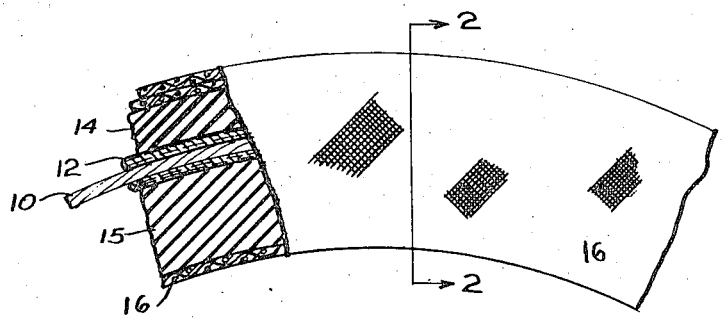
Figure 1 is a fragmentary side elevation of a belt with a portion thereof broken away.
Figure 2:
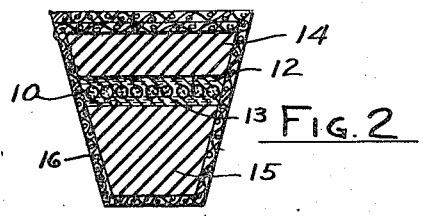
Figure 2 is a section taken on line 2—2, Figure 1.

Referring now to Figure 2, the difference between this and Figure 3 is that in Figure 2, the gum covering of the tension wires, which has been designated by reference numeral 11, has been omitted and the laminations 12 mixed with the fibers 13 is brought into direct contact with the wires 10 of the tension layer. The parts marked 14, 15 and 16 are identical with those shown and described in connection with Figure 3.

Figure 4:
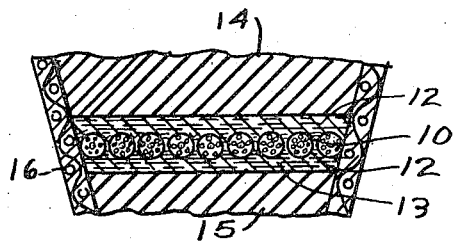
Figure 4 is a fragmentary section corresponding to the one shown in Figure 2, but to a somewhat larger scale.

In Figures 4 and 5, which are merely enlarged views corresponding to Figures 2 and 3, respectively, the several parts have been designated by the reference numerals given above.

By means of this expedient, namely, that of embodying the tension layer in gum rubber compounded to remain soft and either free from or containing cotton fibers, a bond is obtained between the tension wires and the gum which does not separate during the life of the belt; in the same manner the adhesion between laminations 12 and body portions 14 and 15 become so intimate that they do not separate during belt operation.

By this construction the cleavage along the tension layer is prevented and the life of the belt greatly increased.

By positioning the fibers so that they are parallel and extend transversely of the wire tension layer the central body will resist greater forces tending to spread the tension wires and will not add to the belts resistance to flexing in passing around the pulleys.

In the above specification the fibers 13 have been referred to as "cotton fibers"; it is to be understood that any other suitable fibers may be used, such as nylon, rayon, Celanese, etc.

The fibers in the finished belt are preferably arranged parallel and this is effected during the normal operation of calendering with differential rolls.

Although this construction finds its greatest value in connection with belts having stranded wire tension elements, it also gives longer life to similar belts having cotton tension cords.

Since the gum that comes into direct contact with the tension wires 10 is normally tacky and so compounded that it will remain soft as compared to parts 14 and 15, excessive strains tending to separate the tension elements from the body of the belt are avoided because the soft gum yields quite readily to strains.

Having described the invention what is claimed as new is:

1. A belt of the V-type having two body portions spaced by a central assembly comprising a tension layer of stranded metal wires wound in the direction of the length of the belt; a covering of rubber-like material compounded to remain softer than the body portions, in direct contact with the wires and enveloping the same, a lamina of rubber composition compounded to remain softer than the body portions and mixed with textile fibers, positioned on opposite sides of the wire covering, the central assembly and the body portions being adhesively bonded to each other to form the completed belt body.

2. A belt as described in claim 1 in which the wire covering is mixed with fibers.

THEODORE W. STEINKE.

REFERENCES CITED

The following references are of record in the file of this patent:

UNITED STATES PATENTS

| Number | Name | Date |
|---|---|---|
| 1,842,353 | Lorenz | Jan. 19, 1932 |
| 2,054,619 | Freedlander | Sept. 15, 1936 |
| 2,211,202 | Freedlander | Aug. 13, 1940 |
| 2,257,648 | Pierce | Sept. 30, 1941 |
| 2,326,719 | Myers | Aug. 10, 1943 |
| 2,392,373 | Freedlander | Jan. 8, 1946 |
| 2,411,027 | Crosby | Nov. 12, 1946 |
| 2,414,822 | Lindsay et al. | Jan. 28, 1947 |

FOREIGN PATENTS

| Number | Country | Date |
|---|---|---|
| 359,748 | Great Britain | Oct. 29, 1931 |
| 365,293 | Great Britain | Jan. 21, 1932 |